United States Patent
Bendall et al.

(10) Patent No.: US 8,199,813 B2
(45) Date of Patent: Jun. 12, 2012

(54) METHOD FOR EMBEDDING FRAMES OF HIGH QUALITY IMAGE DATA IN A STREAMING VIDEO

(75) Inventors: Clark Alexander Bendall, Syracuse, NY (US); Bradford Morse, Skaneateles Falls, NY (US); Thomas Eldred Lambdin, Auburn, NY (US)

(73) Assignee: GE Inspection Technologies, Lewistown, PA (US)

( * ) Notice: Subject to any disclaimer, the term of this patent is extended or adjusted under 35 U.S.C. 154(b) by 1183 days.

(21) Appl. No.: 11/958,408

(22) Filed: Dec. 18, 2007

(65) Prior Publication Data

US 2009/0158315 A1 Jun. 18, 2009

(51) Int. Cl.
*H04N 7/12* (2006.01)

(52) U.S. Cl. ........... 375/240.03; 375/240.2; 375/240.18; 382/240

(58) Field of Classification Search .................. None
See application file for complete search history.

(56) References Cited

U.S. PATENT DOCUMENTS

| | | | | |
|---|---|---|---|---|
| 7,512,283 | B2* | 3/2009 | Brower et al. | 382/240 |
| 7,782,365 | B2* | 8/2010 | Levien et al. | 348/220.1 |
| 7,876,978 | B2* | 1/2011 | Berger et al. | 382/299 |
| 2001/0055336 | A1* | 12/2001 | Krause et al. | 375/240.11 |
| 2003/0147640 | A1* | 8/2003 | Voss et al. | 396/310 |
| 2006/0050785 | A1* | 3/2006 | Watanabe et al. | 375/240.03 |
| 2006/0280246 | A1* | 12/2006 | Alattar et al. | 375/240.15 |
| 2007/0086669 | A1* | 4/2007 | Berger et al. | 382/243 |
| 2009/0141810 | A1* | 6/2009 | Tabatabai et al. | 375/240.25 |

* cited by examiner

*Primary Examiner* — Donald Mills
(74) *Attorney, Agent, or Firm* — GE Global Patent Operation; Mark A. Conklin

(57) ABSTRACT

A method for embedding frames of image data in a streaming video is disclosed, comprising the steps of receiving a plurality of frames of image data of a target object over a period of time; compressing the plurality of frames of image data; embedding the plurality of compressed frames of image data in a streaming video; initiating a control signal during the period of time to embed a particular frame of image data; selecting a frame of image data from the plurality of frames of image data received near the time the control signal is initiated; embedding a user data marker in the streaming video; and embedding the selected frame of image data in the streaming video as user data, wherein the embedded selected frame of image data has a higher quality than the embedded plurality of compressed frames of image data.

20 Claims, 2 Drawing Sheets

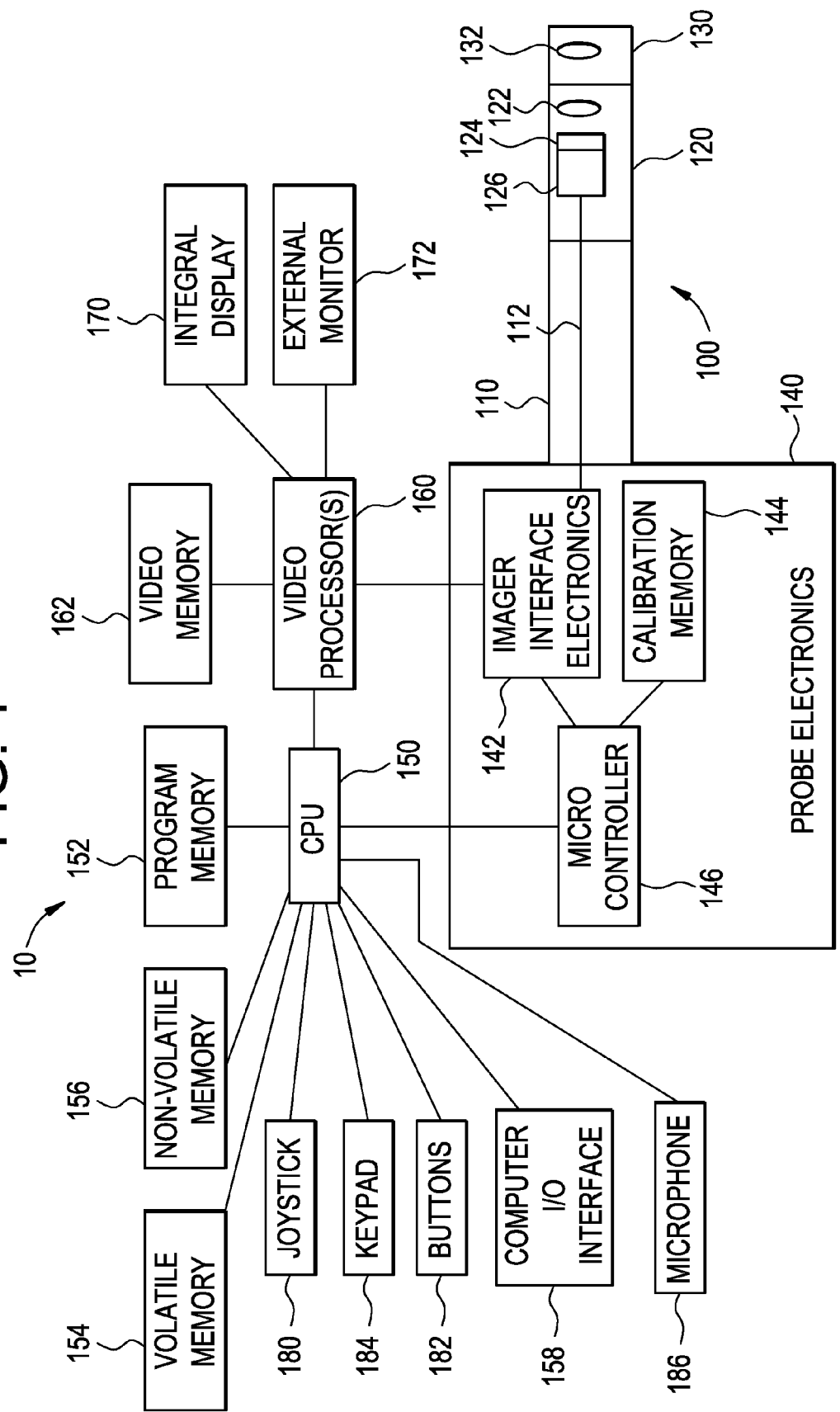

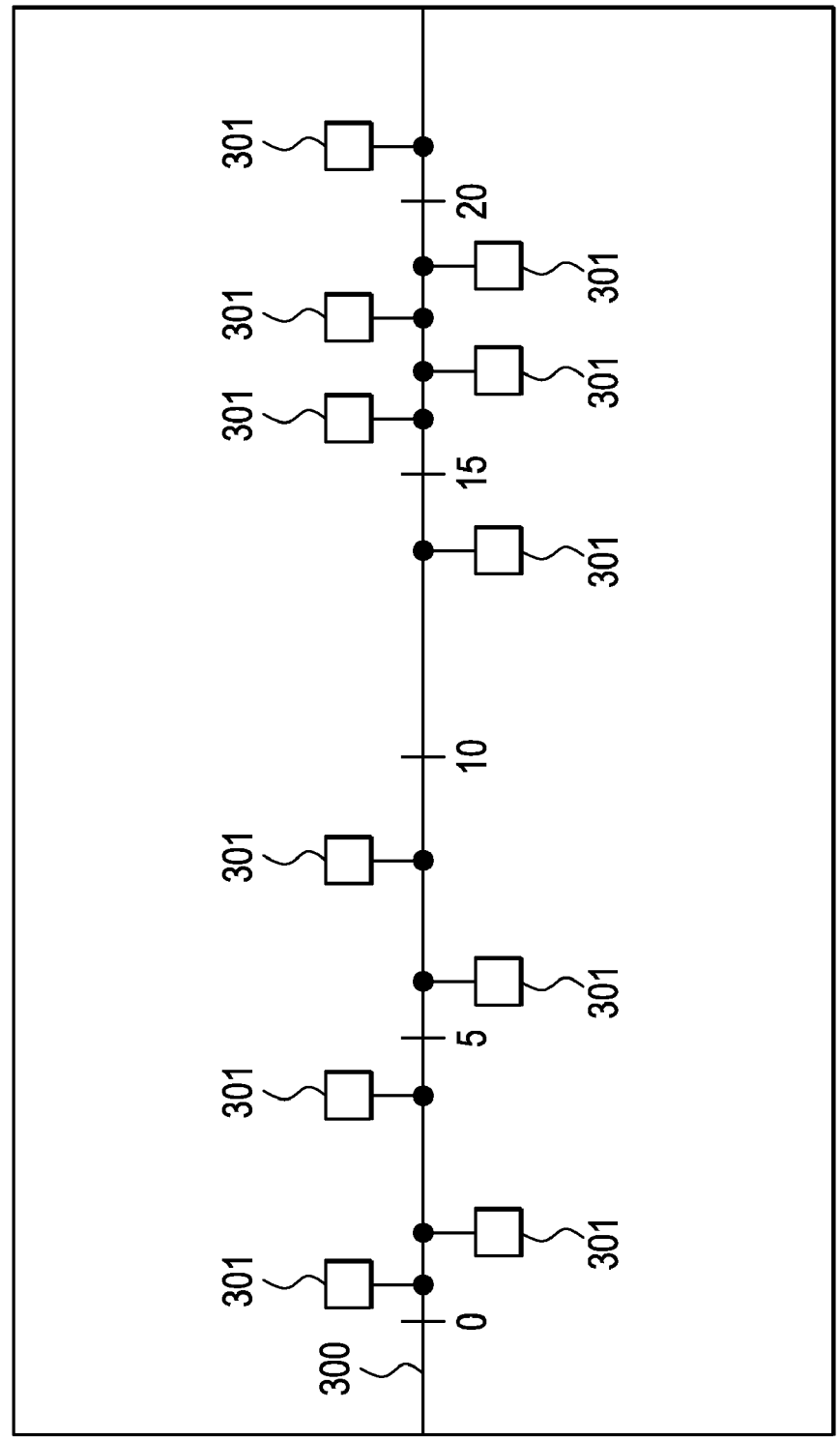

METHOD FOR EMBEDDING FRAMES OF HIGH QUALITY IMAGE DATA IN A STREAMING VIDEO

BACKGROUND OF THE INVENTION

This invention relates generally to video inspection and more particularly to a method for embedding frames of high quality image data in a streaming video.

Video inspection devices, such as video endoscopes, can be used to inspect target objects to identify and analyze defects in the objects both during and after an inspection. During an inspection, an inspector can use a video inspection device to capture still images (e.g., JPEG, BMP, TIFF, PCX, GIF, etc.) of portions of the target object. In order to perform accurate analysis and measurement of the defects during and after the inspection, the still images should be of a high quality (i.e., high resolution with minimal compression) and be stored along with associated calibration data for the probe and/or optical adaptor (or tip) (e.g., measurement technology employed (e.g., stereo), tip configuration (e.g., side view or front view), optical distortion characteristics, field of view, geometrical parameters, etc.). Accordingly, the inspector is required to determine which high quality still images will be needed to analyze the defect and manually command the video inspection device (e.g., by pressing a button) to capture and store those images and associated calibration data during the inspection. If the inspector fails to capture and store an image during the inspection that is needed later for accurate measurement of a defect, the inspection must be conducted again. Since the inspector must be sure to manually capture and store all possible images that may be needed after the inspection, the length of time required to complete the inspection is increased. In addition, in order to facilitate review of these captured and stored images, the inspector typically must provide notes or commentary for each image to provide information regarding the particular image in the context of the entire inspection.

As an alternative or in addition to capturing and storing high quality still images during an inspection, an inspector can also use a video inspection device to capture and store a streaming video (e.g., MPEG, Motion JPEG, AVI, H.264, etc.) of the target object to perform analysis of the defects during and after the inspection. This streaming video helps provide a greater context for the overall inspection, complementing the still images. But since the frames of image data of the streaming video are often of a lower quality (i.e., lower resolution and higher compression) than the high quality still images and are not accompanied by calibration data, accurate measurement of the defects using frames of image data from the streaming video is not possible. Accordingly, if the inspector fails to capture a particular high quality still image of a defect in the streaming video, accurate post-inspection analysis and measurement by the inspector or a third party who may desire different images or have a higher skill level than the inspector (e.g., the owner or manufacturer of the target objects or an expert) is not possible. It would be advantageous to provide a video inspection device using a streaming video of a defect of a target object that could also provide accurate analysis and measurement during and after the inspection even if the inspector failed to manually command the video inspection device to capture and store a high quality image of that defect during the inspection.

It may also be desirable to transmit a streaming video to a remote site for real-time viewing of an inspection by a third party. Due to bandwidth limitations, high compression levels may be required in such a scenario. The third party may desire access to high quality images of certain portions of the inspection subject for improved detail viewing or near real-time measurement. Thus, a system that could provide streaming video, high quality images and, if needed, measurement calibration data, to a remote site would be desirable.

BRIEF DESCRIPTION OF THE INVENTION

A method for embedding frames of image data in a streaming video is disclosed, comprising the steps of receiving a plurality of frames of image data of a target object over a period of time; compressing the plurality of frames of image data; embedding the plurality of compressed frames of image data in a streaming video; initiating a control signal during the period of time to embed a particular frame of image data; selecting a frame of image data from the plurality of frames of image data received near the time the control signal is initiated; embedding a user data marker in the streaming video; and embedding the selected frame of image data in the streaming video as user data, wherein the embedded selected frame of image data has a higher quality than the embedded plurality of compressed frames of image data.

BRIEF DESCRIPTION OF THE DRAWINGS

FIG. 1 is a block diagram illustrating an exemplary video inspection device.

FIG. 2 is a display of an exemplary timeline of a video inspection.

DETAILED DESCRIPTION OF THE INVENTION

FIG. 1 illustrates a video inspection device 10 made in accordance with the preferred embodiment of the invention. Video inspection device 10 can include an elongated probe 100 comprising an insertion tube 110 and a head assembly 120 disposed at the distal end of the insertion tube 110. Insertion tube 110 can be a flexible, tubular section through which all interconnects between the head assembly 120 and probe electronics 140 are passed. Head assembly 120 can include probe optics 122 for guiding and focusing light from the target object onto an imager 124. The probe optics 122 can comprise, e.g., a lens singlet or a lens having multiple components. The imager 124 can be a solid state CCD or CMOS image sensor for obtaining an image of the target object.

A detachable tip or adaptor 130 can be placed on the distal end of the head assembly 120. The detachable tip 130 can include tip viewing optics 132 (e.g., lenses, windows, or apertures) that work in conjunction with the probe optics 122 to guide and focus light from the target object onto an imager 124. The detachable tip 130 can also include illumination LED's (not shown) if the source of light for the video inspection device 10 emanates from the tip 130 or a light passing element (not shown) for passing light from the probe 100 to the target object. The tip 130 can also provide the ability for side viewing by including prisms to turn the camera view and light output to the side. The elements that can be included in the tip 130 can also be included in the probe 100 itself.

The imager 124 can include a plurality of pixels formed in a plurality of rows and columns and can generate image signals in the form of analog voltages representative of light incident on each pixel of the imager 124. The image signals can be propagated through imager hybrid 126, which provides electronics for signal buffering and conditioning, to an imager harness 112, which provides wires for control and video signals between the imager hybrid 126 and the imager interface electronics 142. The imager interface electronics 142 can include power supplies, a timing generator for generating imager clock signals, an analog front end for digitizing the imager video output signal, and a digital signal processor for processing the digitized imager video data into a more useful video format.

The imager interface electronics 142 are part of the probe electronics 140, which provide a collection of functions for operating the video inspection device 10. The probe electronics 140 can also include a calibration memory 144, which stores the calibration data for the probe 100 and/or tip 130. The microcontroller 146 can also be included in the probe electronics 140 for communicating with the imager interface electronics 142 to determine and set gain and exposure settings, storing and reading calibration data from the calibration memory 144, controlling the light delivered to the target object, and communicating with the CPU 150 of the video inspection device 10.

In addition to communicating with the microcontroller 146, the imager interface electronics 142 can also communicate with one or more video processors 160. The video processor 160 can receive a video signal from the imager interface electronics 142 and output signals to various monitors, including an integral display 170 or an external monitor 172. The integral display 170 can be an LCD screen built into the video inspection device 10 for displaying various images or data (e.g., the image of the target object, menus, cursors, measurement results) to an inspector. The external monitor 172 can be a video monitor or computer-type monitor connected to the video inspection device 10 for displaying various images or data.

The video processor 160 can provide/receive commands, status information, streaming video, still images, and graphical overlays to/from the CPU 150 and may be comprised of FPGAs, DSPs, or other processing elements which provide functions such as image capture, image enhancement, graphical overlay merging, distortion correction, frame averaging, scaling, zoom, overlaying, merging, flipping, motion detection, and video format conversion and compression.

The CPU 150 can be used to manage the user's interface and controls by receiving input via a joystick 180, buttons 182, keypad 184, and/or microphone 186, in addition to providing a host of other functions, including image, video, and audio storage and recall functions, system control, and measurement processing. The joystick 180 can be manipulated by the user to perform such operations as menu selection, cursor movement, slider adjustment, and articulation control of the probe 100, and may include a push-button function. The buttons 182 and/or keypad 184 also can be used for menu selection and providing user commands to the CPU 150 (e.g., freezing or saving a still image). The microphone 186 can be used by the inspector to provide voice instructions to freeze or save a still image.

The video processor 160 can also communicate with video memory 162, which is used by the video processor 160 for frame buffering and temporary holding of data during processing. The CPU 150 can also communicate with CPU program memory 152 for storage of programs executed by the CPU 150. In addition, the CPU can be in communication with volatile memory 154 (e.g., RAM), and non-volatile memory 156 (e.g., flash memory device, a hard drive, a DVD, or an EPROM memory device). The non-volatile memory 156 is the primary storage for streaming video and still images.

The CPU 150 can also be in communication with a computer I/O interface 158, which provides various interfaces to peripheral devices and networks, such as USB, Firewire, Ethernet, audio I/O, and wireless transceivers. This computer I/O interface 158 can be used to save, recall, transmit, and/or receive still images, streaming video, or audio. For example, a USB "thumb drive" or CompactFlash memory card can be plugged into computer I/O interface 158. In addition, the video inspection device 10 can be configured to send frames of image data or streaming video data to an external computer or server. The video inspection device 10 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 10 incorporates several transport layer protocols including TCP and UDP and several different layer protocols including HTTP and FTP.

At the outset of an inspection, an inspector can use the controls (i.e., joystick 180, buttons 182, keypad 184, and/or microphone 186) of the video inspection device 10 to communicate with the CPU 150 to enable continuous video recording of the target object as captured by the imager 124 of the elongated probe 100 and transmitted to the imager interface electronics 142. The imager interface electronics 142 can capture and transmit a certain number (e.g., thirty) of frames of image data per second to the video processor 160, which uses a compression algorithm to embed a lower quality version of the frames into the streaming video. For example, the video processor 160 can compress a frame and embed the frame in an MPEG bit stream transmitted to the CPU 150 and/or to the integral display 170 or external monitor 172 for viewing the streaming video if those displays contain the requisite decoding capabilities. From the CPU 150, the streaming video can be stored in non-volatile memory 156 or transmitted via the computer I/O interface 158 to peripheral devices and networks, including a wireless transmitter to allow remote viewing of the inspection.

As described above, however, this streaming video, without more, cannot be used for accurate analysis and measurement of the defects of the target object, tasks that require high quality still images along with associated calibration data. Accordingly, the video inspection device 10 must also be capable of storing high quality still images and associated calibration data in response to trigger events that initiate a control signal to embed a particular frame of high quality image data (e.g., the inspector using the user's interface and controls joystick 180, buttons 182, keypad 184, and/or microphone 186) to request that the video inspection device 10 save a particular image). According to one embodiment of the present invention, after a trigger event, the high quality still images (and associated calibration data and/or three dimensional (3D) surface data) can also be selected and embedded in the same bit stream that stores the low quality streaming video.

For example, in response to a trigger event that initiates a control signal, the video processor 160 can embed a marker (e.g., a header, code, or other identifier used to identify data in a part of a file or bit stream) in the streaming video bit stream to indicate the inclusion of user data. In one embodiment, the selected frame of high quality image data and/or data associated with the selected frame can be embedded after the user data marker as user data in the streaming video bit stream. A user data marker is any marker regardless of its designation (e.g., a user data marker in MPEG or an unused marker) that will identify the location of a selected frame of image data and/or associated data to a custom application that can identify and extract the user data (e.g., selected frames of image data and associated data) for analysis. While this user data can be identified and extracted by a custom application, the user data can be ignored by a standard streaming video bit stream decoder that may have no need to decode the selected frames of image data and/or associated data embedded as user data.

This higher quality still image can be embedded as user data without any compression or with low compression, and may be embedded in a standardized (e.g., JPEG) or raw/native video format (e.g., YCrCb). It will be understood that the selected frame of image data embedded in a streaming video bit stream can be the actual selected frame of image data or a modified representation of the actual selected frame of image data. A visual indication (e.g., an icon) can be provided to the inspector on the integral display 170 or an external monitor 172 to indicate that a higher quality still image has been embedded in the streaming video bit stream. This visual indication can similarly be embedded in the streaming video bit stream to indicate the presence of the higher quality still image.

There are various possible trigger events that can be initiated by the inspector that would signal the video processor 160 to embed a higher quality still image (and associated calibration data and/or 3D surface data) in the streaming video bit stream. For example, the inspector could use the user's interface and controls (manipulating the joystick 180, buttons 182, keypad 184, or providing a verbal command into the microphone 186) to request that the video inspection device 10 embed a particular frame of image data (e.g., freeze, save, etc.) or conduct measurement operations on a particular frame of image data.

Each of these requests can be received by the CPU 150, which can then command the video processor 160 to embed a higher quality still image in the streaming video bit stream.

Other triggering events can be based on the elapsed time of the inspection. For example, another possible triggering event can be the passing of a predetermined interval (e.g., every ten seconds or every three hundred frames of image data). Similarly, yet another possible triggering event can be the passing of a predetermined interval since the last higher quality still image was embedded (e.g., ten seconds or three hundred frames since the last image was embedded). At the passing of the predetermined interval, the video processor 160 can embed a higher quality still image in the streaming video bit stream.

Another triggering event can be based upon the location or registration position of the target object in the frame of image data. For example, if the video inspection device 10 is being used to inspect the blades of a rotating turbine, the video processor 160 can continuously analyze the incoming frames to determine when there exists an image of a blade in a desired position (e.g., by performing edge matching or edge detection). When this desired position is present, the video processor 160 can embed a higher quality still image of that image in the streaming video bit stream.

Similarly, yet another triggering event can be the automatic recognition of a defect in the target object. For example, in the example where the video inspection device 10 is being used to inspect the blades of a rotating turbine, if the video processor 160 determines that there is an image of a blade in a desired position, that image can be compared to a reference image of the blade (e.g., an image of another blade in the turbine or a reference image of that blade stored in a database) to automatically determine whether there are any differences between the images. If the automatic defect recognition algorithm determines that the differences indicate a defect, the video processor 160 can embed a higher quality still image of that image in the streaming video bit stream.

Still another triggering event can be based on the motion in a frame of image data. Based on the observation that an inspector will typically keep the probe 100 and head assembly 120 relatively stationary when viewing an object of interest, the absence of significant motion in a frame of image data or in a predetermined number (X) of successive frames is an indication that the frames may be of particular interest both during and after the inspection for analysis and measurement purposes. When the absence of significant motion (i.e., low motion) is detected in a single frame or in the Xth successive frame, the video processor 160 can embed a higher quality still image in the streaming video bit stream. On the other hand, if video processor 160 determines that a predetermined interval (time or number of frames) has passed where all frames are low motion frames, rather than saving several higher quality still images of the same image in the streaming video bit stream, the video processor 160 can wait before checking for another triggering event. This period of this waiting or delay can be based on a predetermined interval or until there has been a frame that has a higher degree of motion (i.e., not a low motion frame).

In determining a motion parameter for a frame or set of frames, the video processor 160 can determine a binary motion parameter ("high motion" or "low motion" frame) for a frame or can determine a qualitative motion parameter score indicative of a degree of motion (e.g., can develop a motion scale from 0 to 9 where 0 is no motion and a 9 is maximum motion). A qualitative motion parameter score can be converted to a binary motion parameter by subjecting the score to thresholding (e.g., all scores below 2 are deemed to be low motion). Various methods can be used for detecting motion and assigning a motion parameter to a frame.

Where the imager 124 is of the type having an interlaced frame readout mode wherein an odd field of a frame is read out and then an even field, motion can be detected for by subtracting the even field from the odd field. The difference result can be scaled to yield a motion parameter score. When the head assembly 120 is not in motion, a motion parameter score can be expected to be about 0, though diagonal lines and/or horizontal edges may cause non-zero difference results. Even so, such analysis of frames including such diagonal lines and/or horizontal edges generally yields lower difference results for motion-free frames than for frames with motion.

In another method for detecting motion, the video processor 160 can evaluate successively frames buffered in video memory 162 to locate one or more common edges in first and second frames, and can subtract pixel positions forming the common edge of the second frame from the first frame to derive a motion parameter score.

In yet another method for detecting motion, the video processor 160 can examine image data of first and second successively determined super frames. Each super frame can be determined by processing a set of M successively received single frames (i.e., frames having image data corresponding to a specific frame readout period). The processing can include, e.g., averaging or summing M successively received single frames. In one example, with a set of 10 successively received frames, 0 to 9, a first super frame can be derived by averaging frames 0 through 4 and the second super frame can be derived by averaging frames 5 through 9. For conservation of processing requirements, accumulators may be employed for averaging. Super frames can be determined on a moving window basis. For example, during a first frame period, a first accumulator can retain the average or sum of frames (N) . . . (N+4), and a second accumulator can retain the average or sum of frames (N+5) . . . (N+9). In a next frame period, the first accumulator can retain the average or sum of frames (N+1) . . . (N+5) and the second accumulator can retain the average or sum of frames (N+6) . . . (N+10). In one embodiment, in evaluating first and second successively determined super frames, the video processor 160 can locate a common edge in first and second super frames, and subtract pixel positions forming the common edge of the second super frame from the first super frame to derive a motion parameter score. In another embodiment, each new frame can be evaluated for motion relative to a reference frame (typically the first frame in the super frame). If there is little motion, the new frame is added, possibly with an x, y offset to account for detected motion, to an accumulating super frame. Once enough frames are accumulated, the super frame pixel values are divided by the number of frames in the accumulated super frame to produce an output frame for display. If a pre-determined number of frames pass without a frame with low motion relative to the reference frame, the live video is again displayed, and the reference frame is successively updated until motion again stops at which point the accumulation process starts again.

In another embodiment, the video processor 160 can be configured to subtract a super frame from a preceding super frame for purposes of developing a motion parameter. The examination of super frames for determination of a motion parameter is particularly useful where the video stream being examined has a low signal-to-noise ratio. By summing or averaging multiple frames into a super frame, random noise levels are reduced. Thus, comparisons between super frames to detect motion are less affected by noise than would be comparisons between single frames. The signal-to-noise level of a video stream can be expected to be lower, the lower the brightness level of the video stream. Accordingly, in one embodiment, the video processor 160 can be configured to examine a brightness level of incoming frames, and responsively to a detected brightness can be made to switch out of operating in a first mode wherein the video processor 160 examines differences between single frames for detection of motion to a mode wherein the video processor 160 examines super frames for detection of motion.

Because super frames have reduced random noise relative to single frames, it may be desirable to embed a super frame or an averaged super frame as a higher quality still image in the streaming video bit stream when one is available in time proximity to a triggering event. The accumulation of a pre-determined number of frames in a super frame can itself serve as a triggering event.

In addition to embedding higher quality still images in response to trigger events, the video processor 160 can also embed as user data the calibration data for the probe 100 and/or tip 130 associated with these higher quality still images. The calibration data can be stored in, e.g., the calibration memory 144 of the probe electronics 140. The calibration data can be included in the same section of user data or in another section of the streaming video bit stream. For example, since calibration data is often static and may only change upon changing or replacement of a probe 100 or tip 130, the same calibration data for several frames can be embedded into the streaming video bit stream as user data at a single point in the bit stream and associated with each of the separate higher quality still images. In this example, the calibration data will only be embedded into the streaming video bit stream as user data when there is an indication of a change in the probe 100 or tip 130, or when requested by the user (e.g., user entering an identification of the tip 130). Data embedded in such a manner would be generally applicable to high quality still images subsequently embedded in the video bit stream until the next entry of calibration data is embedded in the video bit stream. Alternatively, rather than place only the calibration data for a single probe 100 or tip 130 combination, all possible calibration data sets can be embedded into the streaming video bit stream as user data, allowing later selection of the appropriate set.

In addition to the image data and calibration data for the higher quality frame of image data, the video processor 160 can also embed into the streaming video bit stream as user data 3D surface data associated with the frame. This 3D surface data can be generated by the video processor 160 or CPU 150 through processing of one or more images having stereoscopic views, structured light projections, etc. The 3D surface data can then later be extracted by the custom software application for 3D viewing and/or dimensional analysis.

For several of the triggering events described above, the triggering event may occur when the quality of the current frame of image data is relatively low. Measures of quality of a frame of image data can be made, e.g., in terms of the motion, noise, and/or or brightness of the frame. For example, a frame taken when the head assembly 120 of the probe 100 is experiencing a high degree of motion (a "high motion" frame) will typically be of a lower quality than a still frame taken when the head assembly 120 is stationary or experiencing little motion (a "low motion" frame). If the trigger event occurs during a high motion frame, the lower quality still frame will be embedded into the streaming video bit stream and may not be useful for later analysis and measurement. While the video processor 160 can select the frame available at the instant the trigger event occurred, which may or may not be a high quality image, the video processor 160 can also monitor the quality of the incoming frames (e.g., performing motion parameter processing or other processing to determine another metric of the quality of the image (e.g., noise or brightness) and select a higher quality frame selected from those frames available around the time of the trigger event (i.e., at, before, or after) in addition to or instead of the frame available at the instant the trigger event occurred.

The video processor 160 can be configured to continuously receive frames of image data, wherein the leading edges are the times where a first pixel value for a frame is buffered and the falling edges are the times where a last pixel value of a frame is buffered. The video processor 160 can determine a quality parameter for individual frames within a set of one to N frames. The set of one to N frames can be a set of successively or non-successively received frames of image data. Since the set of one to N frames can be received within a certain time window, the set of one to N frames can be regarded as a "window." This window of frames can then be subjected to quality parameter processing to select a high quality still image to be embedded in the streaming video bit stream.

In one embodiment, a set of N frames subject to quality parameter processing comprises only frames received prior to the trigger event. In another embodiment, a set of frames subject to quality parameter processing comprises both frames received prior to the trigger event and frames received subsequent to the trigger event. In another embodiment, only frames of image data received after the trigger event are subject to processing.

Rules for determining which frame of N frames subject to processing is to be selected in response to a trigger event can be varied. Where the video processor 160 develops a binary quality parameter, while processing a set of N frames in response to a trigger event, it can select the first frame having a "high quality" designation or the Nth frame if no frame is designated as high quality. Similarly, where the video processor 160 develops a qualitative quality parameter score, it can select the first frame having a quality parameter score greater than or equal to a threshold value or the Nth frame if no frame has a score greater than or equal to the threshold. Where the video processor 160 develops a qualitative quality parameter score, after processing a set of N frames in response to a trigger event, it can select the frame having the highest quality parameter score.

When processing image data of a set of N frames, the video processor 160 can buffer each incoming frame to a designated frame buffer location unless the incoming frame has a lower quality score than the currently buffered frame, in which case the incoming frame can be discarded. In such manner it is not necessary to buffer image data of N frames simultaneously when processing image data of N frames for purposes of determining the frame having the highest quality score.

During and after the inspection, a file containing the streaming video, including the higher quality still images (and associated calibration data and 3D surface data) embedded as user data can be available for analysis and measurement. Depending on the particular bit stream format used for the streaming video, a customized software application can be used to extract the embedded user data (indicated by markers in the bit stream) for analysis and measurement.

Various method can be used to access this embedded user data during playback or remote viewing. As described previously, this streaming video can include visual indications (e.g., an icon) to indicate that a higher quality still image has been embedded in the streaming video bit stream at that location. During playback mode or remote viewing on a display, a user can request access to the higher quality still image and associated data embedded in proximity to the displayed icon. During playback mode or remote viewing, the user can also enter a command (e.g., measure command), whereby the nearest available embedded higher quality still image can then be accessed for analysis and measurement. Alternatively, as shown in FIG. 2, the entire inspection or a portion of the inspection can be depicted visually on a display 302 in a timeline 300, with user-selectable thumbnails 301 shown at the times where higher quality still images were embedded in the streaming video. Custom software could also be used to extract all the higher quality still images and calibration data in a given video bit stream and save them as individual still images with or without the calibration data embedded in the individual still images.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for embedding frames of image data in a streaming video comprising the steps of:
   receiving a plurality of frames of image data of a target object over a period of time;
   compressing said plurality of frames of image data;
   embedding said plurality of compressed frames of image data in a streaming video;
   initiating a control signal during said period of time to embed a particular frame of image data;
   selecting a frame of image data from said plurality of frames of image data received near the time said control signal is initiated;
   embedding a user data marker in said streaming video; and
   embedding said selected frame of image data in said streaming video as user data, wherein said embedded selected frame of image data has a higher quality than said embedded plurality of compressed frames of image data.

2. The method of claim 1, further comprising the step of embedding calibration data associated with said selected frame of image data in said streaming video as user data.

3. The method of claim 1, further comprising the step of embedding three dimensional surface data associated with said selected frame of image data in said streaming video as user data.

4. The method of claim 1, wherein said streaming video is an MPEG bit stream.

5. The method of claim 1, wherein said embedded selected frame of image data is not compressed.

6. The method of claim 1, wherein said embedded selected frame of image data is embedded in JPEG format.

7. The method of claim 1, wherein said embedded selected frame of image data is compressed at a lower compression ratio than said embedded plurality of compressed frames of image data.

8. The method of claim 1, wherein said control signal is initiated in response to receiving a request by a user during said period of time to embed a particular frame of image data.

9. The method of claim 1, wherein said control signal is initiated in response to a user performing a measurement operation during said period of time.

10. The method of claim 1, wherein said control signal is initiated in response to the expiration of a predetermined interval.

11. The method of claim 1, wherein said control signal is initiated in response to determining that said target object displayed in one or more of said plurality of frames of image data is in a predetermined position in said image data.

12. The method of claim 1, wherein said control signal is initiated in response to determining that there are differences between the image data of said target object displayed in one or more of said plurality of frames of image data in a predetermined position and a reference image of said target object.

13. The method of claim 1, wherein said control signal is initiated in response to determining that one or more of said plurality of frames of image data is a low motion frame.

14. The method of claim 1, wherein said selected fame is a frame from said plurality of frames of image data received at the time that said control signal is initiated.

15. The method of claim 1, wherein said selected frame is a frame from said plurality of frames of image data received before the time that said control signal is initiated.

16. The method of claim 1, wherein said selected frame is a frame from said plurality of frames of image data received after the time that said control signal is initiated.

17. The method of claim 1, wherein said selected frame is a super frame created from two or more frames from said plurality of frames of image data received near the time that said control signal is initiated.

18. The method of claim 1, further comprising the step of storing the streaming video.

19. The method of claim 1, further comprising the step of transmitting the streaming video to a remote location.

20. A method for embedding frames of image data in a streaming video comprising the steps of:
   receiving a plurality of frames of image data of a target object over a period of time;
   compressing said plurality of frames of image data;
   embedding said plurality of compressed frames of image data in a streaming video;

receiving a request by a user during said period of time to embed a particular frame of image data;

initiating a control signal during said period of time to embed a particular frame of image data;

selecting a frame of image data from said plurality of frames of image data received near the time said control signal is initiated;

embedding a user data marker in said streaming video;

embedding said selected frame of image data in said streaming video as user data, wherein said embedded selected frame of image data has a higher quality than said embedded plurality of compressed frames of image data; and embedding calibration data associated with said selected frame of image data in said streaming video as user data.

* * * * *

UNITED STATES PATENT AND TRADEMARK OFFICE
CERTIFICATE OF CORRECTION

PATENT NO. : 8,199,813 B2
APPLICATION NO. : 11/958408
DATED : June 12, 2012
INVENTOR(S) : Bendall et al.

Page 1 of 1

It is certified that error appears in the above-identified patent and that said Letters Patent is hereby corrected as shown below:

In Column 4, Line 44, delete "joystick" and insert -- (joystick --, therefor.

In Column 10, Line 44, in Claim 14, delete "fame" and insert -- frame --, therefor.

Signed and Sealed this
Eighth Day of January, 2013

David J. Kappos
*Director of the United States Patent and Trademark Office*